United States Patent
Allen et al.

(10) Patent No.: US 6,804,703 B1
(45) Date of Patent: Oct. 12, 2004

(54) SYSTEM AND METHOD FOR ESTABLISHING PERSISTENT RESERVES TO NONVOLATILE STORAGE IN A CLUSTERED COMPUTER ENVIRONMENT

(75) Inventors: James P. Allen, Austin, TX (US); Gerald Francis McBrearty, Austin, TX (US); Johnny Meng-Han Shieh, Austin, TX (US); Thomas Van Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/599,184

(22) Filed: Jun. 22, 2000

(51) Int. Cl.[7] .......................... G06F 11/16; G06F 15/16
(52) U.S. Cl. .......................... 709/216; 714/13; 714/10
(58) Field of Search ................ 709/213, 215; 714/13, 10

(56) References Cited

U.S. PATENT DOCUMENTS

| | | | | |
|---|---|---|---|---|
| 5,588,111 A | * | 12/1996 | Cutts et al. ............... | 714/9 |
| 6,286,056 B1 | * | 9/2001 | Edgar et al. ............... | 710/5 |
| 6,370,656 B1 | * | 4/2002 | Olarig et al. ............. | 714/23 |
| 6,393,539 B1 | * | 5/2002 | Nguyen et al. ........... | 711/164 |
| 6,532,538 B1 | * | 3/2003 | Cronk et al. .............. | 713/2 |

* cited by examiner

*Primary Examiner*—David Y. Eng
(74) *Attorney, Agent, or Firm*—Joseph T. Van Leeuwen; Mark S. Walker (57) ABSTRACT

A system and method for recovering from a failure in a clustered environment sharing a common nonvolatile storage device. The first computer reserves the device by identifying itself in a reservation key associated with the device. The first device sends a signal to one or more backup computers informing the backup computers that the first computer is operational. When the first computer fails to operate, one of the backup computers breaks the first computer's reservation to the storage device and writes a new reservation key to the reservation storage area identifying the backup computer as the reservation holder of the storage device. When the first computer is reinitialized, it reads the reservation storage area and does not attempt to break the reservation made by the backup computer. One embodiment provides for the first computer to request control from the backup computer upon being reinitialized whereupon the backup computer releases its reservation and relinquishes control. Another embodiment provides for the first computer to act as a backup computer. Writing to the nonvolatile storage device simultaneously from multiple paths, such as from a NUMA machine, is further disclosed using a reservation key identifying the computer.

22 Claims, 9 Drawing Sheets

Figure 9

SYSTEM AND METHOD FOR ESTABLISHING PERSISTENT RESERVES TO NONVOLATILE STORAGE IN A CLUSTERED COMPUTER ENVIRONMENT

BACKGROUND OF THE INVENTION

1. Technical Field

The present invention relates in general to a method and system for establishing persistent reserves in a clustered computer environment.

2. Description of the Related Art

Server computer systems are used to provide many functions to computer networks. On the Internet, server computers are used to host web sites that provide users with an array of services, including electronic shopping, consumer information, reference materials, communication with other Internet users, and scores of other uses.

Users of online servers, both Internet accessible and private, or intranet, accessible, demand high availability to data and programs provided by these servers. Nonvolatile storage devices include mass storage devices such as hard disks, magneto-optical drives, and storage area networks (SANs). Nonvolatile storage devices provide a repository for data and programs used by server computers.

In order to provide high availability, multiple server computers are often clustered to provide redundant, or backup, servers in case a server fails. Each of the multiple servers, or nodes, can access the nonvolatile storage device that is shared among the servers in the cluster. However, having more than one node simultaneously write to a common nonvolatile storage device may introduce data corruption and other failures on the nonvolatile storage device. To prevent corrupting data on the nonvolatile storage device, a persistent reserve is created on the nonvolatile storage device.

The persistent reserve is a means of reserving a nonvolatile storage device for a particular node in the cluster. One method of establishing a persistent reserve is by using the Small Computer System Interface (SCSI). SCSI provides a protocol and a set of commands for establishing a persistent reserve.

In a clustered environment, one node establishes a disk reserve thereby reserving a nonvolatile storage device. The node with the reserve prevents other nodes from accidentally writing to the device. However, if the first node fails, a backup node is able to break the first node's reservation and reserve the nonvolatile storage device for itself. The backup node determines whether the primary is operational by listening for a signal, sometimes called a "heartbeat," that is sent by the primary computer. In this manner, service from the server is uninterrupted from the perspective of an end user. While the prior art provides redundancy and some level of reserves, challenges still face the clustered environment in providing fail over support.

When the primary server fails and is subsequently reinitialized, it attempts to resume control of the nonvolatile storage device. The primary server breaks the backup server's reserve held on the nonvolatile storage device and resets the primary reserve. The backup server, meanwhile, has been set to act as the new primary server (since the first primary server failed) causing the backup server to once again break the primary server's reserve and again reset the primary reserve. The primary and backup servers can continue to thrash for control of the nonvolatile storage device decreasing system throughput and efficiency.

In addition, some computer systems, such as non-uniform memory architecture (NUMA) computer systems, have multiple paths to the nonvolatile storage device. These paths include processors and corresponding memory areas. To improve performance, each of the paths is connected to the nonvolatile storage device across a separate connection. A challenge with the prior art is that establishing a disk reserve only allows one of the two or more paths to operate at a time. To allow both paths to operate simultaneously, the nonvolatile storage device can be opened without reserving the device, however as discussed previously this may result in multiple nodes writing to the nonvolatile storage device and corrupting the data.

For further information regarding persistent reserves in a SCSI environment, see the T10 homepage (www.t10.org). T10 is a Technical Committee of the National Committee on Information Technology Standards. Documents specific to persistent reserves using the SCS3 protocol can be found in the T10 Document Proposals section (www.t10.org/doc98.htm) of the web site. Persistent Reserve documents in the section include "SPC-2, Persistent Reservation: Additional proposed corrections," (Doc. Nos. 98-124R0. through R2), "Clarification of Persistant Reservation," (Doc. No. 98-140R0), "Persistent Reservations," (Doc. Nos. 98-203R0 through R0), as well as other information generally found throughout the T10 web site.

SUMMARY

It has been discovered that creating a reserve based on a key that includes an computer identifier that identifies the computer with the reserve allows the computer to access the nonvolatile storage device using more than one path. In addition, the identifier is used to prevent a reinitialized server from inadvertently breaking a backup server's reserve thus preventing the reinitialized server and the backup server from thrashing for control of the nonvolatile storage device.

The first server writes a reservation key to the reservation storage area. The first server's reservation key identifies the first server as having the reservation to the nonvolatile storage device. If the first server (or any subsequent server in control of the nonvolatile storage device.) has multiple paths to the nonvolatile storage device, each of the paths use a reservation key allowing each path to access and write to the nonvolatile storage device. In one embodiment, writing a reservation key to the reservation storage area includes registering the key with the device and establishing a reserve of the device that is accomplished by a server in a single step.

The first server sends a signal, or "heartbeat", across a network or other connection to one or more backup servers. So long as the signal is received by the backup servers, the backup servers do not attempt to break the first server's reserve and write to the nonvolatile storage device. However, when the signal is terminated, one of the backup servers breaks the first server's reserve and over-writes the reservation storage area with a key identifying the backup server as the server reserving the nonvolatile storage device. When the first server is reinitialized, it reads the reservation storage area and determines that the backup server now has reserved the nonvolatile storage device. In one embodiment, namely a SCSI environment or using a SCSI protocol performed in a fiber channel environment, the process of breaking the reserve includes registering as new key, revoking the prior reservation, and establishing a new reserve that is accomplished in a single step.

In one embodiment, the first server sends a message to the backup server informing the backup server that the first server is once again operational. In this embodiment, an orderly switch is made replacing the backup server's reservation with the first server's reservation key. This embodiment is useful when the first server has better processing capabilities than the backup server.

In another embodiment, when the first server is reinitialized it reads the reservation storage area and determines that the backup server has reserved the nonvolatile storage device. In this embodiment, the first server assumes a backup role and listens to a signal, or heartbeat, being sent by the backup server. When the backup server's signal terminates, indicating that the backup server is no longer operational, the first server breaks the reservation and once again reserves the nonvolatile storage device for itself.

In yet another embodiment, multiple backup servers provide backup support. When the primary server fails, multiple backup servers may attempt to take the place of the failed primary server. The first backup server that compares and successfully matches the reservation key that was owned by the primary server with the reservation key stored in the reservation storage area breaks the reserve and establishes its own reserve to the nonvolatile storage device. Thereafter, other backup servers, from the same or different clusters, compare the key with the storage area and no longer receive successful matches because the first backup server has already established a new reserve. Because the match is unsuccessful, the other backup servers do not break the reserve that has been established.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
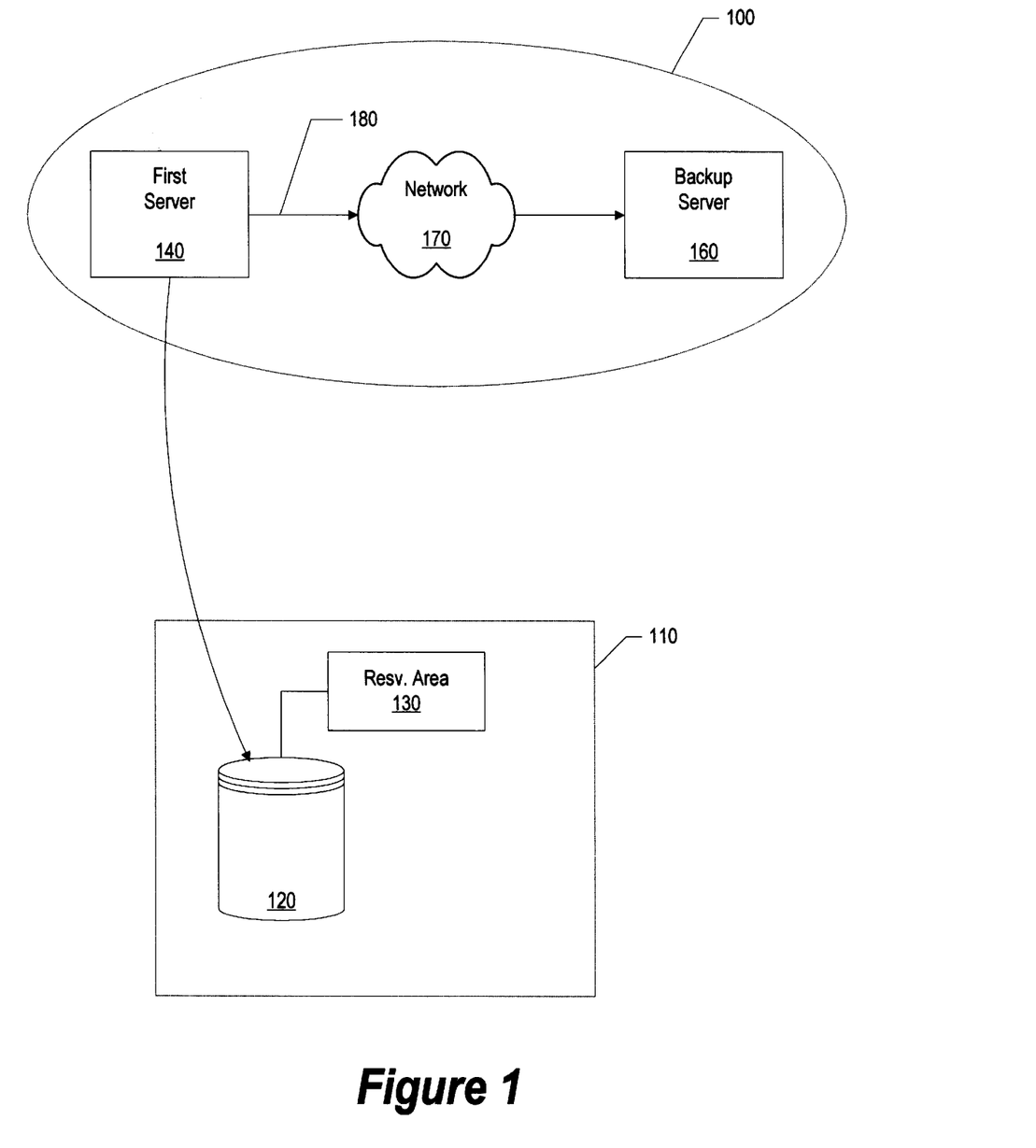
FIG. 1 is a block diagram of a first server within a cluster establishing a persistent reserve.

FIG. 1 shows a block diagram of a server computer establishing a reservation to a nonvolatile storage device. Cluster 100 includes first server 140 and backup server 160 interconnected with computer network 170. Computer network 170 may be a standard local area network, such as a token ring or Ethernet network, a cable connecting first server 140 and backup server 160, or any type of network, such as the Internet, allowing first server 140 and backup server 160 to communicate with one another. First server 140 sends signal 180 to backup server 160 across network 170. Signal 180 may optionally include identifying information regarding first server 140, such as a node identifier that uniquely identifies first server 140. So long as backup server 160 receives signal 180, first server 140 is recognized as being operational and in control of nonvolatile storage device 120. Nonvolatile storage area 110 includes one or more nonvolatile storage devices 120 and one or more reservation storage areas 130. Multiple nonvolatile storage devices 120 may be configured as a set of mirrored disks, disk arrays, or RAID devices. As shown in FIG. 1, first server 140 has established a reservation to nonvolatile storage device 120 by writing a reservation key to reservation storage area 130. The reservation key includes identification (i.e., a node address) of first server 140 as the reservation holder of nonvolatile storage device 120. First server 140 writes to nonvolatile storage device 120 using first path 150. First path 150 remains open so long as first server has reserved nonvolatile storage device 120.

In one embodiment, namely a SCSI environment or using a SCSI protocol in a fiber channel environment, writing a reservation key to the reservation storage area includes registering the key with the device and establishing a reserve of the device. This process is accomplished by a server in a single step. Herein, the process of registering a key and establishing a new reserve will be referred to as writing a reservation key to the reservation storage area.

Figure 2:
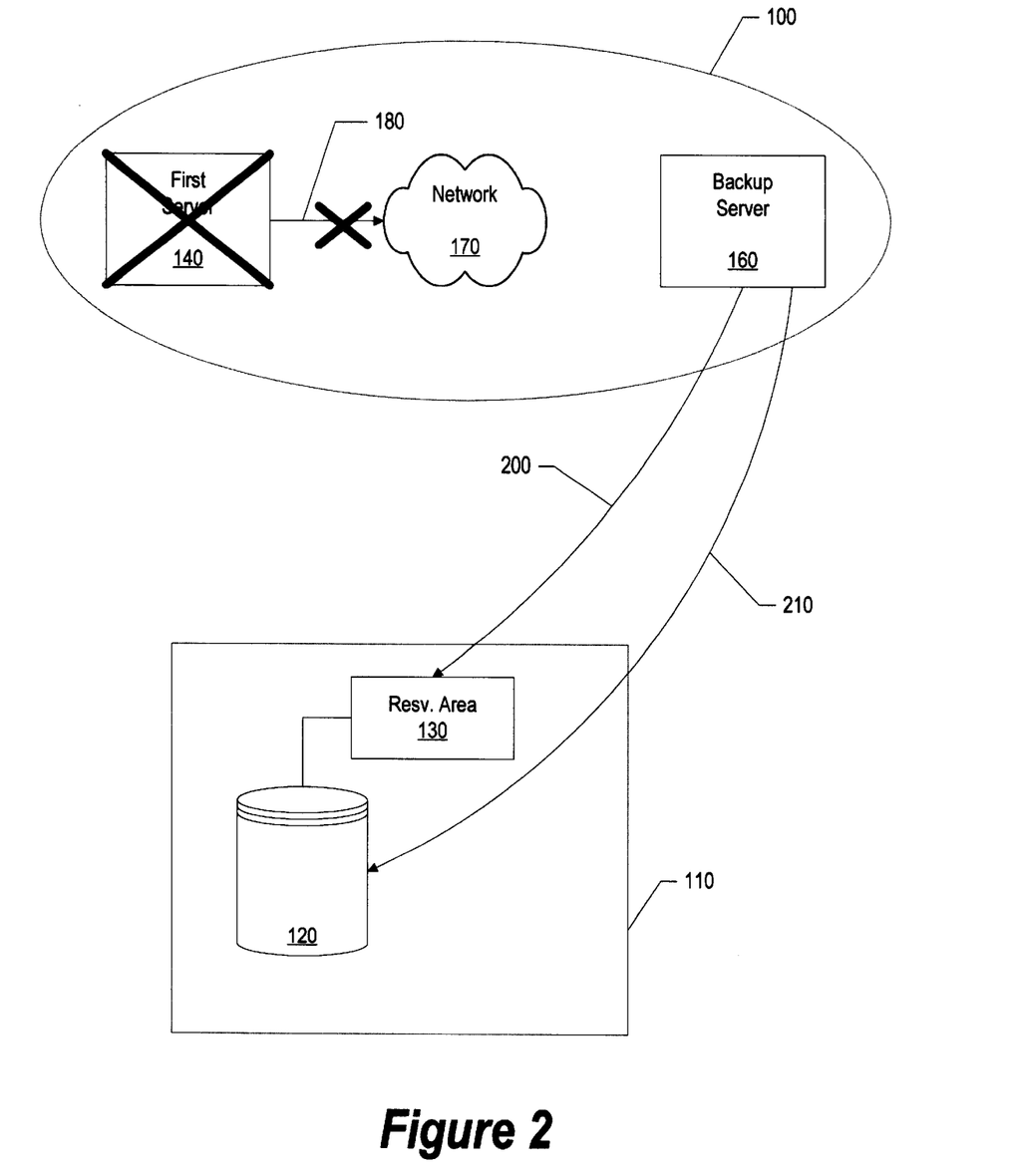
FIG. 2 is a block diagram of a backup server reserving a nonvolatile storage device in response to a failure with the first server.

FIG. 2 illustrates control being transferred to backup server 160 in response to first server 140 becoming nonoperational. As shown, first server 140 has failed and consequently no longer sends signal 180 to backup server 160. When backup server 160 no longer detects signal 180, backup server 160 uses path 200 to break the reservation that first server 140 placed on nonvolatile storage device 120 and writes a different reservation key to reservation storage are 130. The new reservation key identifies backup server 160 as having the reservation to nonvolatile storage device 120. Backup server now writes to nonvolatile storage device 120 across path 210. In one embodiment, namely a SCSI environment or using a SCSI protocol performed in a fiber channel environment, the process of breaking the reserve includes registering a new key, revoking the prior reservation, and establishing a new reserve that is accomplished in a single step.

In a preferred embodiment, the reservation key is created to include the node identifier for the server that currently has the reserve on nonvolatile storage device 120. In order to break first server 140's reserve, backup server 160 matches the node identifier that it recognizes as the current reserve holder with the reservation key stored in reservation storage area 130. In this manner, multiple backup machines may monitor first server 140 and any one of the possible backup machines can break the reserve when first server 140 fails. The first backup server successfully matches the node identifier that it recognizes as the reserve holder (i.e., received in signal 180 sent from first server 140) with the reservation key stored in reservation storage area 130. The next backup server, also trying to take control from failed first server 140, fails to match the node identifier that it recognizes as the reserve holder (first server 140's identifier) with the reservation key in reservation storage area 130. The match fails because the first backup server already wrote its reservation key to reservation storage area 130. In this manner, only one backup server takes over for a failed server while multiple backup servers are able to stand ready in case they are eventually needed.

Figure 3:
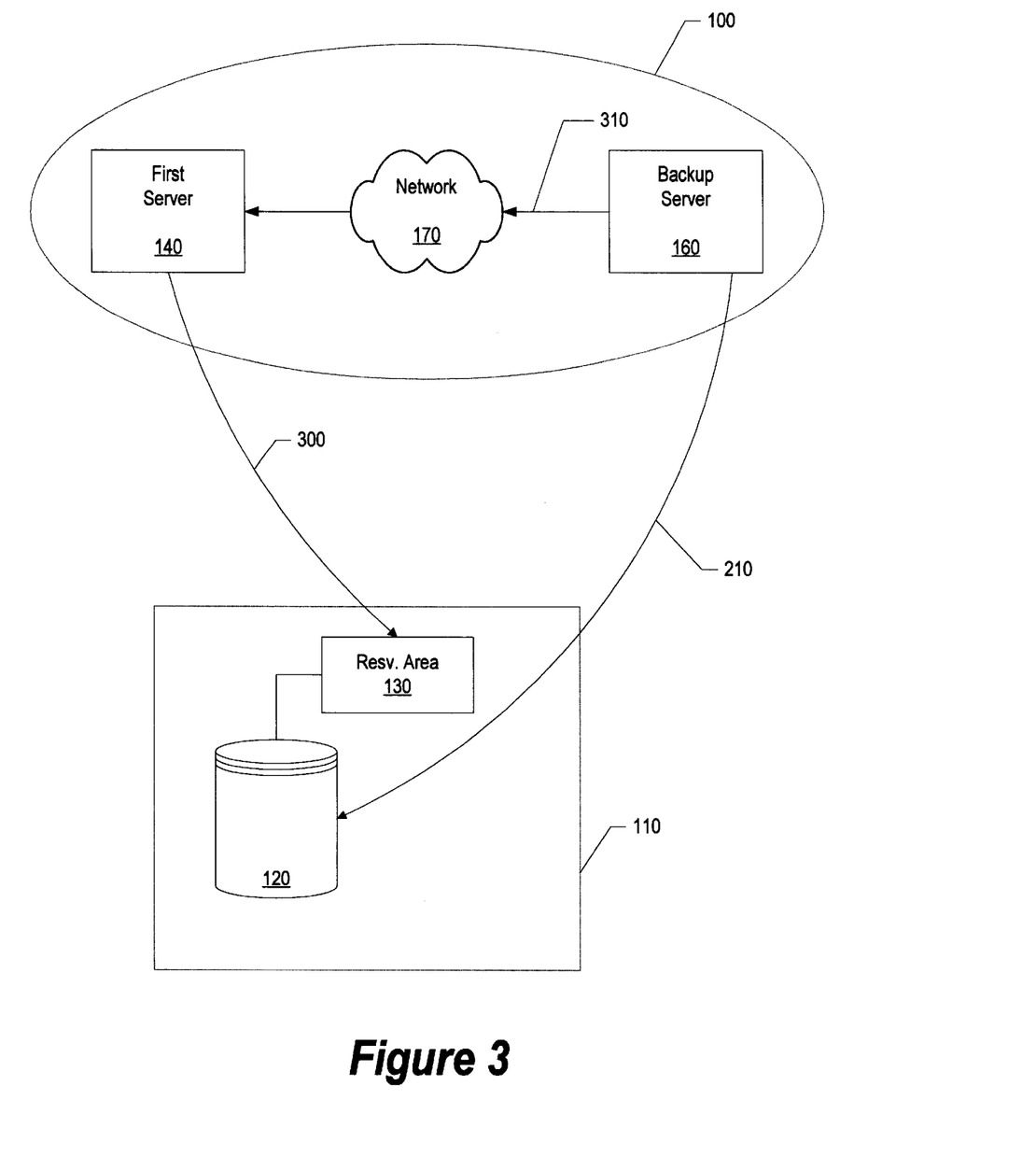
FIG. 3 is a block diagram of a reinitialized first server reading the reservation storage area.

FIG. 3 illustrates re-initialization processing performed when first server 140 becomes operational after failing. When first server 140 failed, backup server 160 reserved nonvolatile storage device 120 and set the reservation key to identify backup server 160 as the key holder (see FIG. 2). When first server 140 reinitializes, it reads reservation storage area 130 using path 300. First server then determines that the reservation key currently stored in reservation storage area 130 belongs to backup server 160. Because the reservation key does not identify first server 140, first server 140 does not attempt to write to nonvolatile storage device 120 and does not attempt to break backup server's reservation to the device. Backup server 160, having reserved nonvolatile storage device 120 and having taken over writing operations to the device, sends signal 310 to other computers in cluster 100 (including first server 140). If backup server 160 fails, signal 310 will terminate and another computer, such as first server 140, will take action to back up backup server 160 (as further described in FIG. 4).

Figure 4:
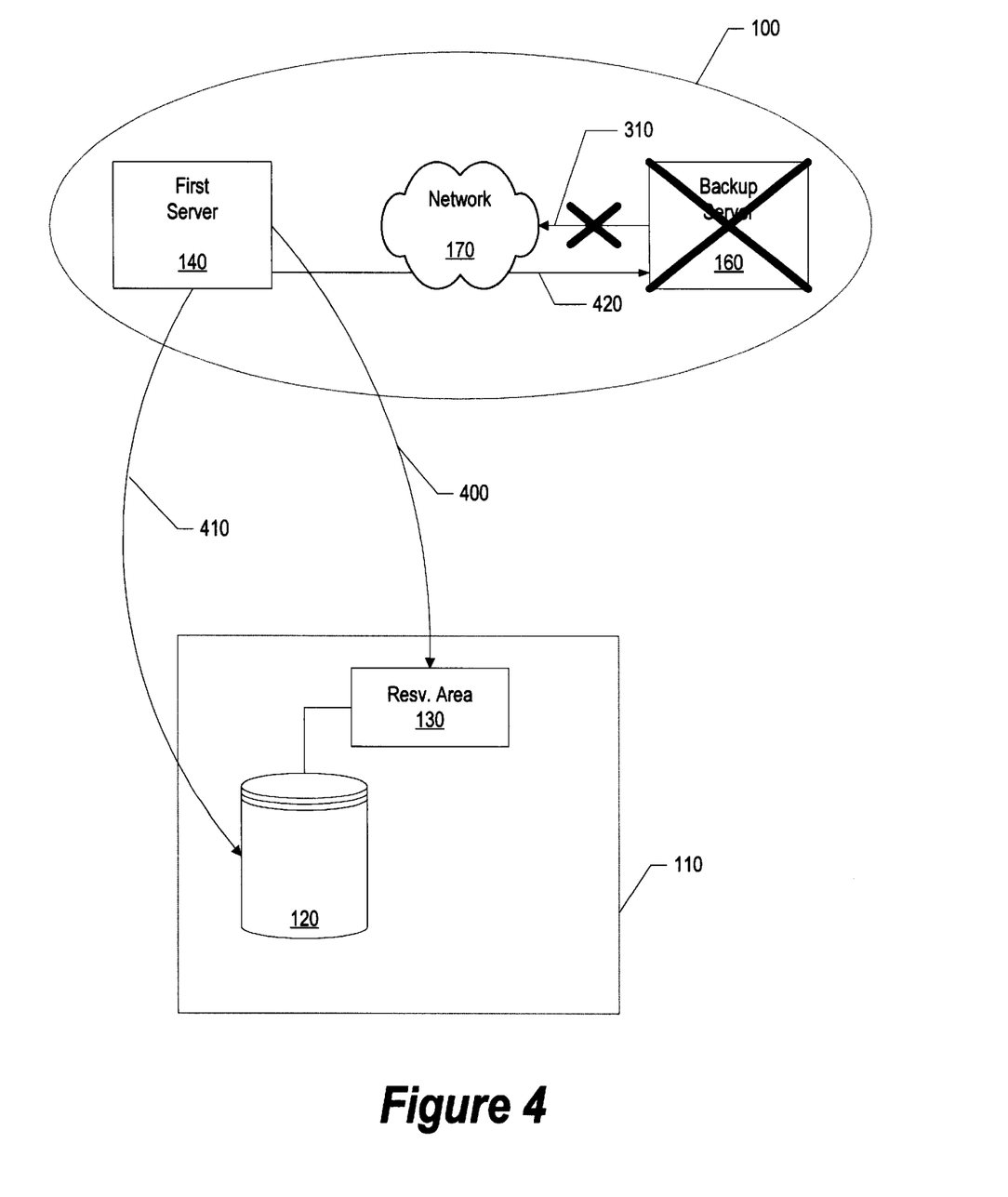
FIG. 4 is a block diagram of a first server resuming control from the backup server in response to a failure.

FIG. 4 shows backup server 160 failing and signal 310 terminating. In response to backup server 160's failure, first server 140 breaks backup server's reservation to nonvolatile storage device 120 using path 400. First server 140 also resets reservation storage area 130 to identify first server 130 as the reservation holder of nonvolatile storage device 120. First server 140 then processes requests received by cluster 100 and accesses and writes to nonvolatile storage device 120 using path 410. In addition, first server 140 sends signal 420 to other computers, or nodes, within cluster 100 indicating that first server 140 is operational.

Figure 5:
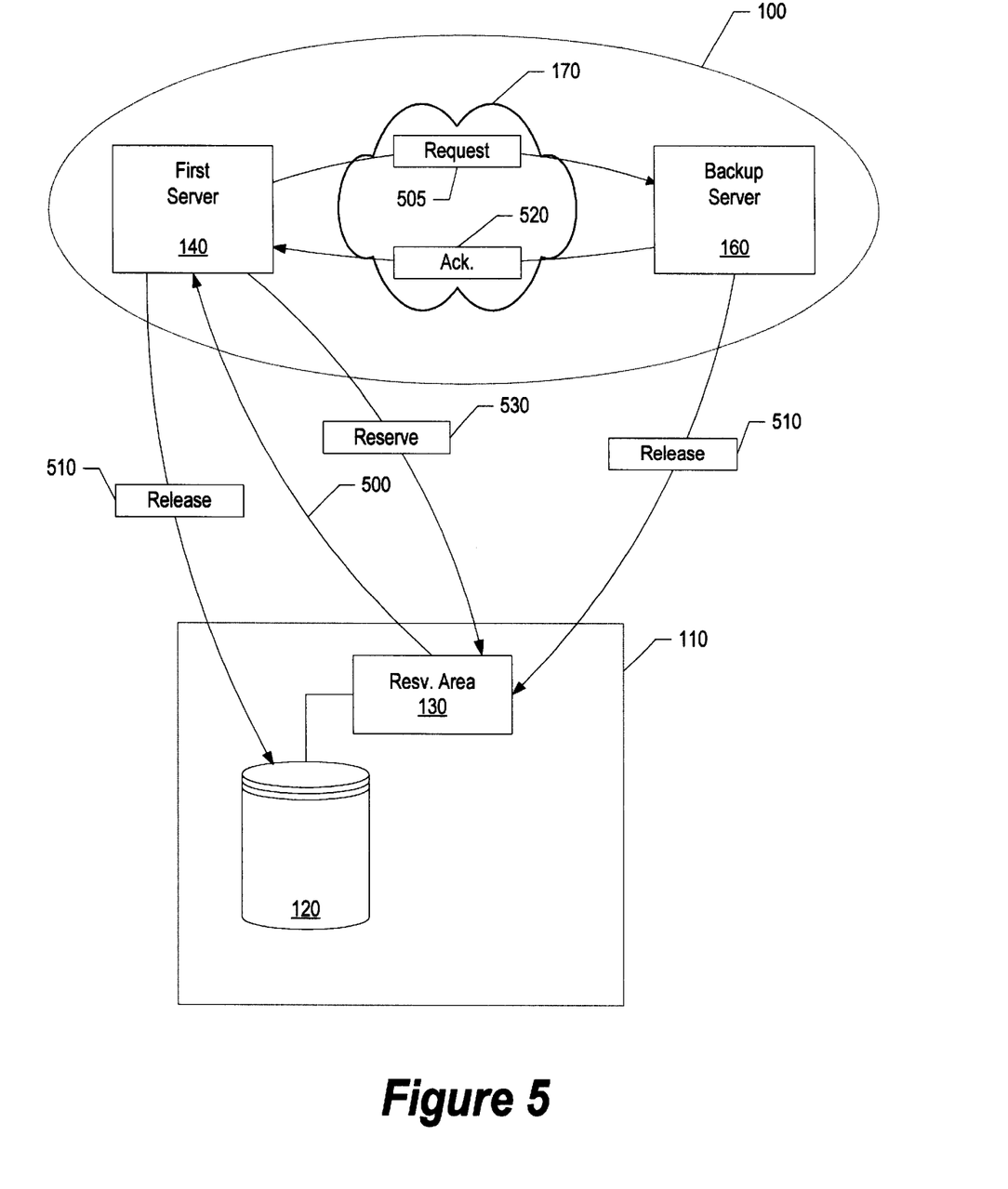
FIG. 5 is a block diagram of control transferring back to a first server in response to a control request to the backup server.

FIG. 5 shows an alternative method of first server 140 resuming primary control over nonvolatile storage device 120. In FIG. 5, first server 140 is reinitialized whereupon it reads reservation storage area 130 using path 500. First server 140 determines that backup server 160 has control of nonvolatile storage device 120. In this case, however, the system administrator wishes to have first server 140 maintain control whenever it is operational. This decision may be because first server 140 is more powerful or has greater capabilities than backup server 160. In order to resume control, first server 140 sends backup server control request 505 instructing backup server 160 to relinquish control to first server 140. Backup server 160 completes the current batch of processing and sends release command 510 to reservation storage area 130 thereby releasing backup server's reservation of nonvolatile storage device 120. Backup server also sends first server 140 acknowledgement 520 informing first server 140 that backup server 160 has released its reservation to nonvolatile storage device 120. First server 140 then writes new reservation key 530 to reservation storage area 130 to reserve nonvolatile storage area 120. First server 140 takes over processing and sending data 540 to nonvolatile storage device 120.

Figure 6:
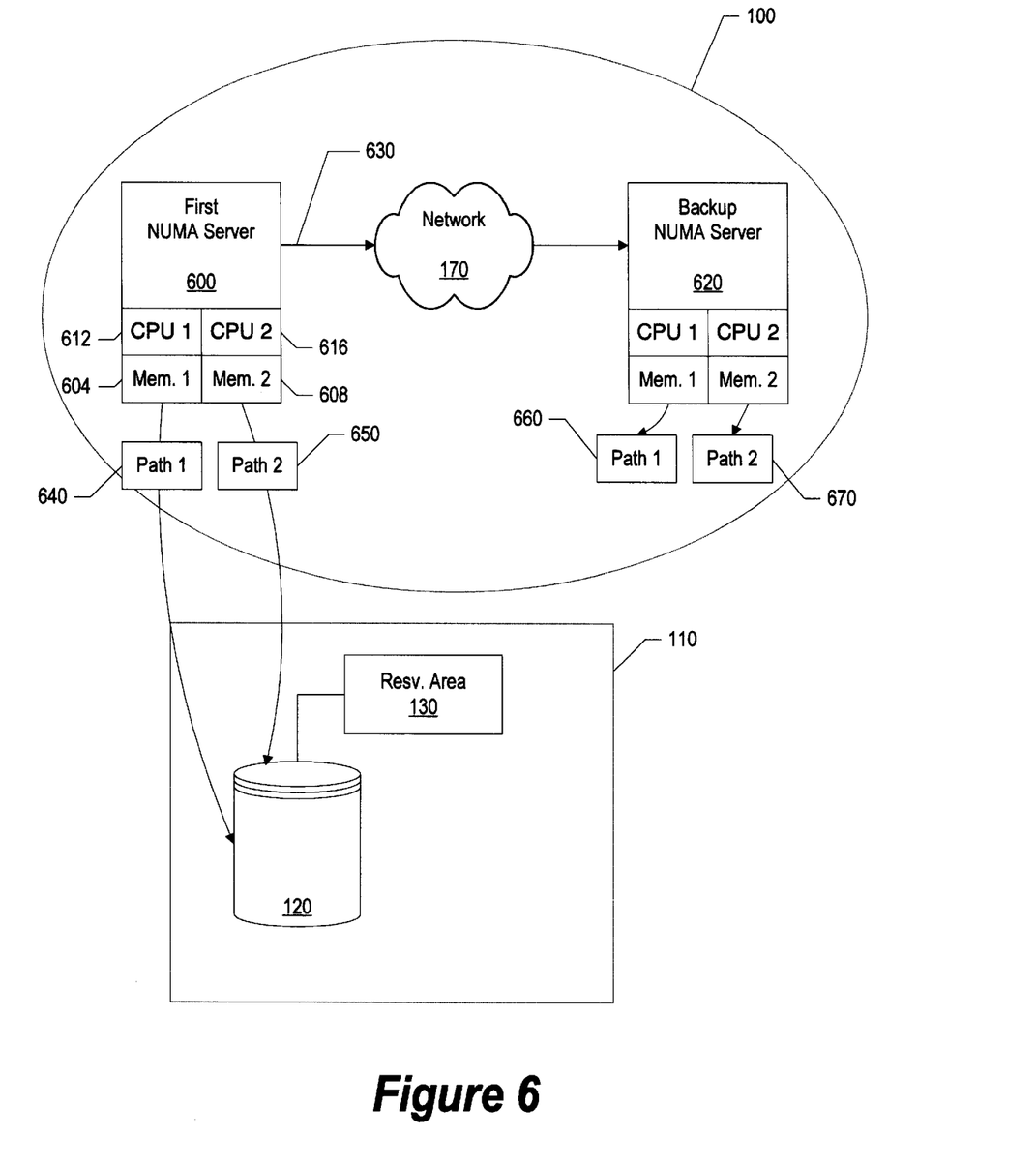
FIG. 6 is a block diagram of a server with multiple paths accessing and writing to a reserved nonvolatile storage device.

FIG. 6 illustrates a server with multiple paths accessing and writing to reserved nonvolatile storage device 120. In some computer systems multiple paths to a common storage device facilitate more efficient processing and of data to the storage device. For example, in non-uniform memory architecture machine (NUMA server 600), more than one memory area exist, in this case memory area 604 and 608. Each of these memory areas is better served by a different processor. For example, processor 612 can access memory area 604 quickly, while processor 612's access of memory area 608 is, by comparison, slow. Conversely, processor 616 accesses memory area 608 quickly and accesses memory area 604 slowly. Because of the different access speeds of the memory area, it is more efficient to dedicate a separate path from each processor/memory area to nonvolatile storage device 120. In this fashion, path 640 is dedicated to processor 612/memory area 604, while path 650 is dedicated to processor 616/memory area 608. The reservation key stored in reservation storage area 130 identifies NUMA server 600 as the reservation holder of nonvolatile storage device 120. Because both path 640 and path 650 use the same reservation key (identifying NUMA server 600), NUMA server 600 is able to write to nonvolatile storage device 120 across both paths. In similar fashion, backup NUMA server 620 can have paths 660 and 670 that can write to nonvolatile storage device 120 if NUMA server 600 fails causing signal 630 to terminate.

Figure 7:
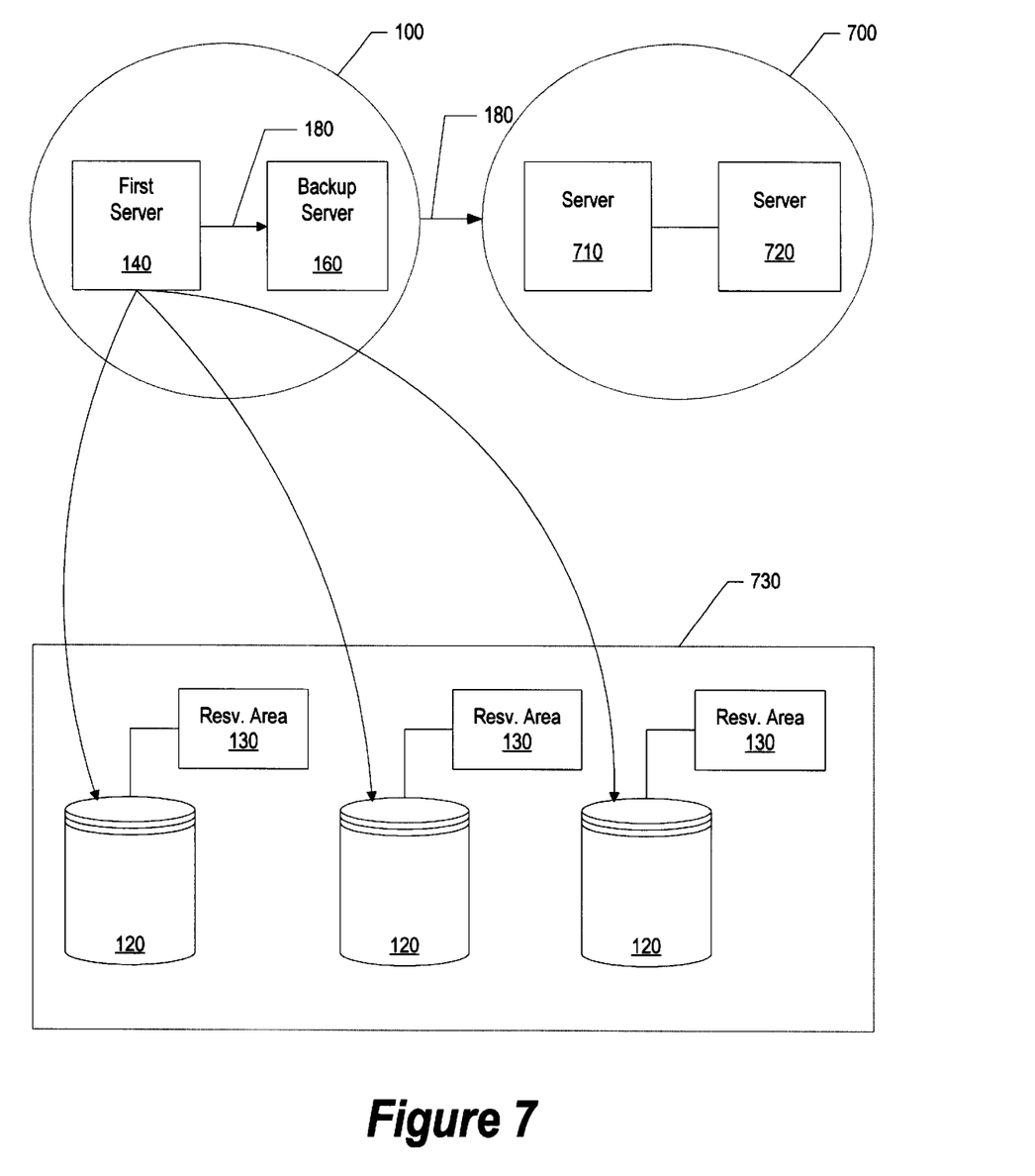
FIG. 7 is a block diagram of multiple clusters establishing reserves to a nonvolatile storage device.

FIG. 7 illustrates clusters of computers used in reserving nonvolatile storage devices within volume 730. Cluster 100 and cluster 700 are shown each with two computers. Cluster 100 includes first server 140 and backup server 160 while cluster 700 includes computer 710 and computer 720. In this example, since computers from both clusters can access the nonvolatile storage devices within volume 730, the reservation key stored in each reservation storage area identifies the reserving computer's cluster identifier as well as the reserving computer's node identifier. In this manner, backup servers can be established at a cluster, as well as a node, level. The reservation key identifying the cluster identifier and node identifier causes only the current reserving computer or cluster to access and write to the nonvolatile storage devices within volume 730.

Signal 180 is now sent from first server 140 to backup server 160 and to server 710 and server 720. When signal 180 ceases, backup machines identify that first server 140 is no longer operational and attempt to take over first server 140's functions, including its reserve to nonvolatile storage devices within volume 730. In a preferred embodiment, the reservation key stored in reservation storage area 130 not only identifies the node identifier for first server 140 but also the cluster identifier for cluster 100. As in the single cluster example described earlier (see. FIG. 2), each backup server (160, 710, and 720) matches the reservation key they recognize as previously reserving the nonvolatile storage devices with the actual reservation key stored in reservation storage area 130. The first backup server will be successful because the reservation key still identifies first server 140 (the key including first server 140's node identifier as well as the cluster identifier identifying cluster 100). The first backup server places its reservation key (identifying its node identifier and cluster identifier) in reservation storage area 130. Other backup servers that subsequently compare the reservation key they recognize as previously placing the reserve (corresponding to first server 140) with the reservation key stored in reservation storage area 130 (now identifying the first backup server) will have an unsuccessful match and will consequently not break the existing reserve on the nonvolatile storage device.

Figure 8:
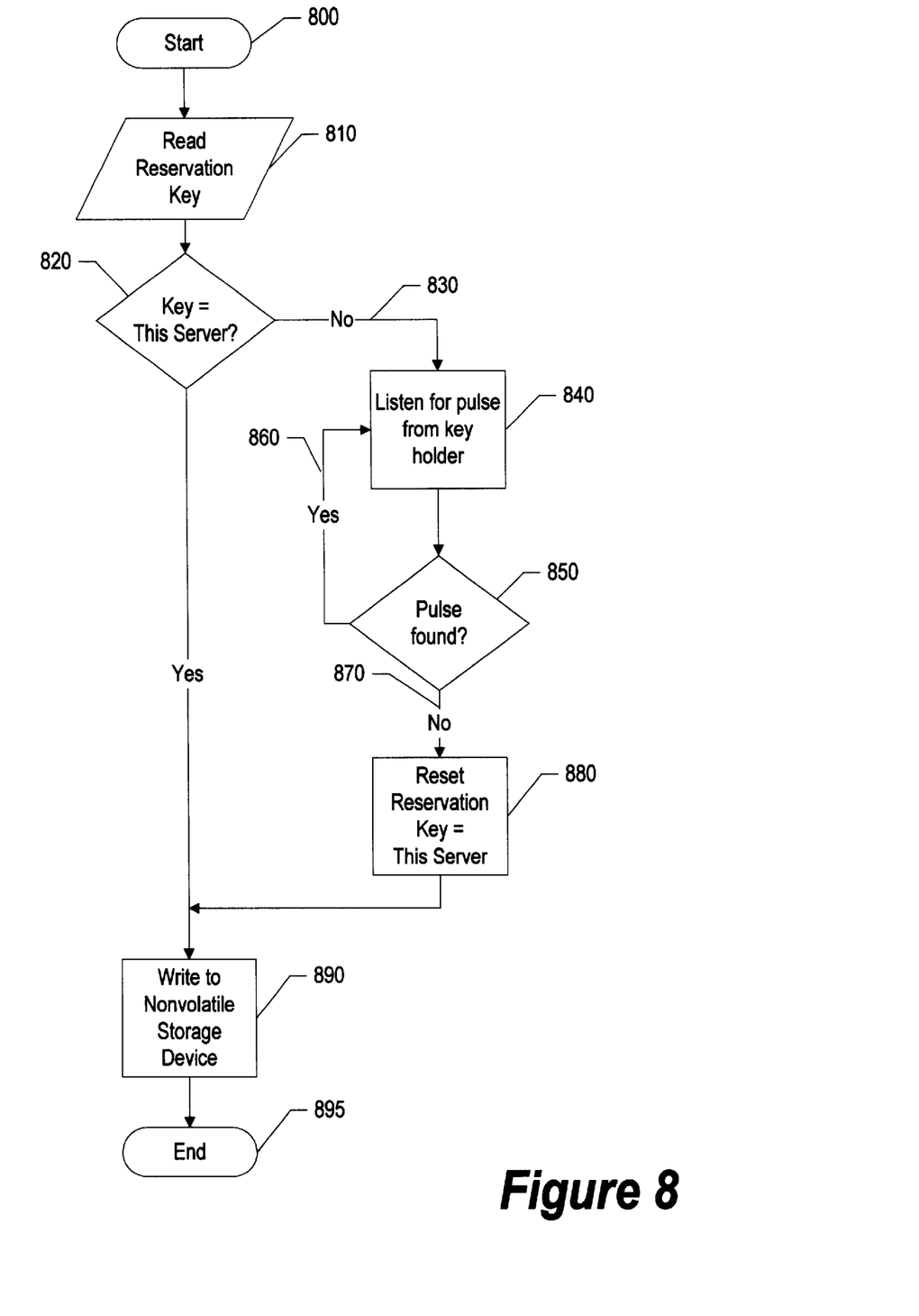
FIG. 8 is a flow chart of a server processing the persistent reserve.

FIG. 8 shows a flowchart for reinitialization processing by a computer within a cluster with access to a common nonvolatile storage device. Processing commences at initialization step 800. The reservation key is then read from the reservation storage area (step 810). A comparison is made between the reservation key read and the system's own identifier (decision 820). If the reservation key is equal to the system's own identifier, "yes" branch 825 is taken whereupon data is written to the nonvolatile storage device (step 890) before reinitialization processing is terminated (step 895). On the other hand, if the reservation key is not equal to the system's own identifier, some other computer system has reserved the nonvolatile storage device and "no" branch 830 is taken. The system now listens for a pulse, or signal, from the system identified by the reservation key (step 840). The system determines whether a pulse is found (decision 850). If a pulse is found, "yes" branch 860 is taken looping back to the listening step (step 840). On the other hand, if no pulse is found "no" branch 870 is taken whereupon the reservation set by the other machine is broken (step 875) and a new reservation key is written to reservation storage area identifying this computer system as the reservation holder (step 880). Once the new reservation key is written, the computer system is able to write to the nonvolatile storage device (step 890) before terminating reinitialization processing (step 895).

Figure 9:
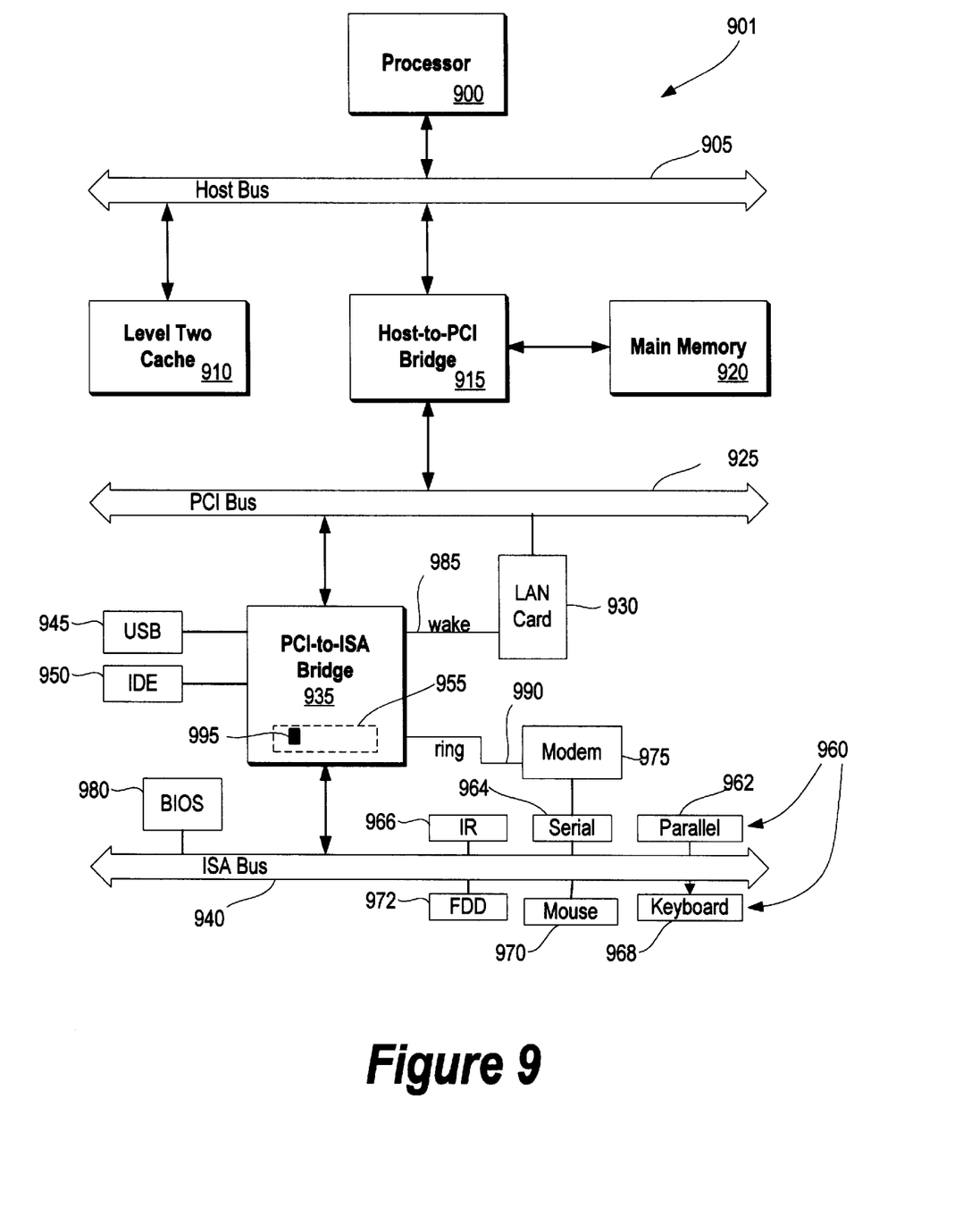
FIG. 9 is a block diagram of an information handling system capable of implementing the present invention.

FIG. 9 illustrates information handling system 901 which is a simplified example of a computer system capable of performing the copy processing described herein. Computer system 901 includes processor 900 which is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. PCI bus 925 provides an interface for a variety of devices including, for example, LAN card 930. PCI-to-ISA bridge 935 provides bus control to handle transfers between PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 990 (e.g., parallel interface 992, serial interface 994, infrared (IR) interface 999, keyboard interface 998, mouse interface 970, and fixed disk (FDD) 972) coupled to ISA bus 940. Alternatively, many I/O devices can be accommodated by a super I/O controller (not shown) attached to ISA bus 940.

BIOS 980 is coupled to ISA bus 940, and incorporates the necessary processor executable code for a variety of low-level system functions and system boot functions. BIOS 980 can be stored in any computer readable medium, including magnetic storage media, optical storage media, flash memory, random access memory, read only memory, and communications media conveying signals encoding the instructions (e.g., signals from a network). In order to attach computer system 901 another computer system to copy files over a network, LAN card 930 is coupled to PCI-to-ISA bridge 935. Similarly, to connect computer system 901 to an ISP to connect to the Internet using a telephone line connection, modem 975 is connected to serial port 994 and PCI-to-ISA Bridge 935.

While the computer system described in FIG. 9 is capable of executing the copying processes described herein, this computer system is simply one example of a computer system. Those skilled in the art will appreciate that many other computer system designs, are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of changing a reservation to a nonvolatile storage device, said method comprising:

reserving the nonvolatile storage device by a first computer, wherein the reserving includes writing a first identifier corresponding to the first computer to a reservation storage area corresponding to the nonvolatile storage device;

sensing, at a second computer, that the first computer is inoperative;

in response to the sensing, changing the reservation to the nonvolatile storage device to the second computer, the changing including writing a second identifier corresponding to the second computer to the reservation storage area;

establishing one or more transmission paths from the second computer to the nonvolatile storage device, wherein each transmission path uses a reservation key stored in the nonvolatile storage device; and allowing each transmission path to the communicate with the nonvolatile storage device based upon the transmission path's reservation key.

2. The method as described in claim 1 further comprising:
   determining, at the first computer, that the reservation to the nonvolatile storage device has been changed to the second computer, the determining performed when the first computer becomes operational; and
   the first computer refraining from reserving the nonvolatile storage device in response to the determination.

3. The method as described in claim 1 wherein the reserving further comprises:
   registering a reservation key with the nonvolatile storage device; and
   establishing a reserve of the nonvolatile storage device.

4. The method as described in claim 3 wherein the registering and establishing are performed in a single commuter operation.

5. The method as described in claim 1 further comprising:
   breaking the reservation of the first computer to the nonvolatile storage device in response to the sensing, wherein the breaking further comprises:
   registering the second identifier with the nonvolatile storage device;
   revoking the reservation between the first computer and the nonvolatile storage device; and
   establishing a new reserve of the nonvolatile storage device.

6. The method as described in claim 1 further comprising:
   sending a message from the first computer to the second computer upon the first computer becoming operational after the reservation has been changed to the second computer; and
   in response to the second computer receiving the message, changing the reservation to the nonvolatile storage device to the first computer, the changing including rewriting the first identifier corresponding to the first computer back to the reservation storage area.

7. The method as described in claim 1 further comprising:
   selecting the second computer from a plurality of backup computers, the selecting further comprising:
   each of the backup computers attempting to break the reservation of the first computer to the nonvolatile storage device; and
   each of the backup computers attempting to establish a new reservation to the nonvolatile storage device, wherein the second computer is the first from the plurality of backup computers to successfully break the reserve of the first computer and the first to successfully establish the reservation.

8. A clustered computer system comprising:
   a nonvolatile storage device including:
      a reservation storage area; and
      a nonvolatile storage area;
   a first computer including:
      one or more first processors;
      a memory accessible by the one or more first processors;
      one or more paths connecting the first computer to the nonvolatile storage device;
   a second computer including:
      one or more second processors;
      a memory accessible by the one or more second processors;
      one or more paths connecting the second computer to the nonvolatile storage device;
   a first reservation stored in the reservation storage area that includes a first identifier that corresponds to the first computer; and
   a reservation tool for changing the reservation stored in the reservation storage area, the reservation tool including:
      means or sensing, at the second computer, that the first computer is inoperative; and
      in response to the sensing, means for changing the reservation to the nonvolatile storage device to the second computer, the means for changing including means for writing a second identifier corresponding to the second computer to the reservation storage area.

9. The clustered computer system as described in claim 8 wherein the reservation tool further comprises:
   means for determining, at the first computer, that the reservation to the nonvolatile storage device has been changed to the second computer, the means for determining performed when the first computer becomes operational; and
   means for the first computer to refrain from reserving the nonvolatile storage device in response to the determination.

10. The clustered computer system as described in claim 8 wherein the reservation tool further comprises:
    means for establishing multiple transmission paths from the second computer to the nonvolatile storage device, wherein each transmission path uses a reservation key stored in the nonvolatile storage device; and
    means for allowing each transmission path to communicate with the nonvolatile storage device based upon the transmission path's reservation key.

11. The clustered computer system as described in claim 8 wherein the means for changing the reservation further comprises:
    means for registering a reservation key with the nonvolatile storage device; and
    means for establishing a reserve of the nonvolatile storage device.

12. The clustered computer system as described in claim 11 wherein the means for registering and the means for establishing are performed in a single computer operation.

13. The clustered computer system as described in claim 8 wherein the reservation tool further comprises:
    means for breaking the reservation of the first computer to the nonvolatile storage device in response to the sensing, wherein the means for breaking further comprises:
    means for registering the second identifier with the nonvolatile storage device;
    means for revoking the reservation between the first computer and the nonvolatile-storage device; and
    means for establishing a new reserve of the nonvolatile storage device.

14. The clustered computer system as described in claim 8 wherein the reservation tool further comprises:
    means for sending a message from the first computer to the second computer upon the first computer becoming operational after the reservation has been changed to the second computer; and
    in response to the second computer receiving the message, means for changing the reservation to the nonvolatile storage device to the first computer, the changing including means for rewriting the first identifier corresponding to the first computer back to the reservation storage area.

15. The clustered computer system as described in claim 8 wherein the reservation tool further comprises:

means for selecting the second computer from a plurality of backup computers, the means for selecting further comprising:

means for each of the backup computers to attempt to break the reservation of the first computer to the nonvolatile storage device; and means for each of the backup computers to attempt to establish a new reservation to the nonvolatile storage device, wherein the second computer is the first from the plurality of backup computers to successfully break the reserve of the first computer and the first to successfully establish the reservation.

16. A computer program product stored on a computer operable medium for changing a reservation to a nonvolatile storage device, said computer program product comprising:

means for reserving the nonvolatile storage device by a first computer, wherein the means for reserving includes means for writing a first identifier corresponding to the first computer to a reservation storage area corresponding to the nonvolatile storage device;

means for sensing, at a second computer, that the first computer is inoperative;

in response to the first computer being inoperative, means for changing the reservation to the nonvolatile storage device to the second computer, the means for changing including means for writing a second identifier corresponding to the second computer to the reservation storage area;

means for establishing one or more transmission paths from the second computer to the nonvolatile storage device, wherein each transmission path uses a reservation key stored in the nonvolatile storage device; and means for allowing each transmission path to the communicate with the nonvolatile storage device based upon the transmission path's reservation key.

17. The computer program product as described in claim 16 further comprising:

means for determining, at the first computer, that the reservation to the nonvolatile storage device has been changed to the second computer, the determination performed when the first computer becomes operational; and means for the first computer to refrain from reserving the nonvolatile storage device in response to the determination.

18. The computer program product as described in claim 16 wherein the means for reserving further comprises:

means for registering a reservation key with the nonvolatile storage device; and means for establishing a reserve of the nonvolatile storage device.

19. The computer program product as described in claim 18 wherein the means for registering and means or establishing are performed in a single computer operation.

20. The computer program product as described in claim 16 further comprising:

means for breaking the reservation of the first computer to the nonvolatile storage device in response to the sensing, wherein the means for breaking further comprises:

means for registering the second identifier with the nonvolatile storage device;

means for revoking the reservation between the first computer and the nonvolatile storage device; and means for establishing a new reserve of the nonvolatile storage device.

21. The computer program product as described in claim 16 further comprising:

means for sending a message from the first computer to the second computer upon the first computer becoming operational after the reservation has been changed to the second computer; and in response to the second computer receiving the message, means for changing the reservation to the nonvolatile storage device to the first computer, the means for changing including means for rewriting the first identifier corresponding to the first computer back to the reservation storage area.

22. The computer program product as described in claim 16 further comprising:

means for selecting the second computer from a plurality of backup computers, the means for selecting further comprising:

means for each of the backup computers to attempt to break the reservation of the first computer to the nonvolatile storage device; and means for each of the backup computers to attempt to establish a new reservation to the nonvolatile storage device, wherein the second computer is the first from the plurality of backup computers to successfully break the reserve of the first computer and the first to successfully establish the reservation.

\* \* \* \* \*

UNITED STATES PATENT AND TRADEMARK OFFICE
CERTIFICATE OF CORRECTION

PATENT NO. : 6,804,703 B1
DATED : October 12, 2004
INVENTOR(S) : Allen et al.

It is certified that error appears in the above-identified patent and that said Letters Patent is hereby corrected as shown below:

Column 8,
Line 65, please delete "to the communicate" and insert -- to communicate --.

Column 9,
Lines 14-15, please delete "commuter" and insert -- computer --.

Column 10,
Line 16, please delete "beer" and insert -- been --.

Column 11,
Lines 36-37, please delete "to the communicate" and insert -- to communicate --.

Signed and Sealed this

Fifteenth Day of March, 2005

JON W. DUDAS
*Director of the United States Patent and Trademark Office*